US012652482B2

(12) United States Patent
Yukawa et al.

(10) Patent No.: US 12,652,482 B2
(45) Date of Patent: Jun. 9, 2026

(54) DISPLAY DEVICE

(71) Applicant: Panasonic Intellectual Property Management Co., Ltd., Osaka (JP)

(72) Inventors: Masahiro Yukawa, Kyoto (JP); Ken Miura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 145 days.

(21) Appl. No.: 18/847,547

(22) PCT Filed: Jun. 13, 2023

(86) PCT No.: PCT/JP2023/021866
§ 371 (c)(1),
(2) Date: Sep. 16, 2024

(87) PCT Pub. No.: WO2024/034250
PCT Pub. Date: Feb. 15, 2024

(65) Prior Publication Data
US 2025/0211884 A1 Jun. 26, 2025

(30) Foreign Application Priority Data
Aug. 12, 2022 (JP) ................................ 2022-128968

(51) Int. Cl.
*H04R 1/02* (2006.01)
*H04R 3/12* (2006.01)
*H04R 7/04* (2006.01)
*H04R 9/04* (2006.01)
*H04R 9/02* (2006.01)
*H04R 9/06* (2006.01)

(52) U.S. Cl.
CPC ............. *H04R 1/025* (2013.01); *H04R 1/028* (2013.01); *H04R 3/12* (2013.01); *H04R 7/045* (2013.01); *H04R 9/025* (2013.01); *H04R 9/046* (2013.01); *H04R 9/06* (2013.01); *H04R 2499/15* (2013.01)

(58) Field of Classification Search
CPC .......... H04R 1/025; H04R 1/028; H04R 3/12; H04R 9/06; H04R 7/045
USPC .................. 381/333, 87, 332, 306, 388, 301
See application file for complete search history.

(56) References Cited

U.S. PATENT DOCUMENTS

2019/0349685 A1 11/2019 Choi et al.
2020/0162804 A1 5/2020 Lee et al.
2020/0192141 A1 6/2020 Lee et al.
(Continued)

FOREIGN PATENT DOCUMENTS

JP 2020-095270 A 6/2020
JP 2021-012372 A 2/2021

OTHER PUBLICATIONS

International Search Report dated Aug. 1, 2023 issued in International Patent Application No. PCT/JP2023/021866, with English translation.

*Primary Examiner* — Thjuan K Addy
(74) *Attorney, Agent, or Firm* — Rimon P.C.

(57) ABSTRACT

A display device includes: a display panel that displays an image on a front surface of the display panel; a rear cover that includes a front surface facing a back surface of the display panel; and an audio output unit that outputs audio by causing the rear cover to vibrate. The audio output unit is provided spaced apart from the back surface of the display panel and supported on a back surface of the rear cover.

5 Claims, 8 Drawing Sheets

(56) References Cited

U.S. PATENT DOCUMENTS

| | | | | |
|---|---|---|---|---|
| 2020/0359120 | A1* | 11/2020 | Heo ....................... | H04R 1/028 |
| 2021/0006879 | A1 | 1/2021 | Kim et al. | |
| 2023/0060070 | A1* | 2/2023 | Ikeda ..................... | H04R 7/045 |

* cited by examiner

DISPLAY DEVICE

CROSS-REFERENCE TO RELATED APPLICATIONS

This application is the U.S. National Phase under 35 U.S.C. § 371 of International Patent Application No. PCT/JP2023/021866, filed on Jun. 13, 2023, which in turn claims the benefit of Japanese Patent Application No. 2022-128968, filed on Aug. 12, 2022, the entire disclosures of which Applications are incorporated by reference herein.

TECHNICAL FIELD

The present disclosure relates to a display device capable of outputting audio.

BACKGROUND ART

A display device disclosed in Patent Literature (PTL) 1 includes a display panel that displays an image on a front surface of the display panel, a rear cover disposed such that a front surface of the rear cover faces a back surface of the display panel, and an audio output unit fixed on the back surface of the display panel. The audio output unit outputs audio by causing the display panel to vibrate. Furthermore, a relatively large space for allowing the display panel to vibrate is provided between the back surface of the display panel and the front surface of the rear cover.

CITATION LIST

Patent Literature

[PTL 1] Japanese Unexamined Patent Application Publication No. 2021-12372

SUMMARY OF INVENTION

Technical Problem

The present disclosure provides a display device that can improve the heat dissipation performance of a display panel.

Solution to Problem

A display device according to the present disclosure includes: a display panel that displays an image on a front surface of the display panel; a rear cover that includes a front surface facing a back surface of the display panel; and an audio output unit that outputs audio by causing the rear cover to vibrate, the audio output unit being provided spaced apart from the back surface of the display panel and supported on a back surface of the rear cover.

Advantageous Effects of Invention

The display device according to the present disclosure can improve the heat dissipation performance of the display panel.

DESCRIPTION OF EMBODIMENT

Hereinafter, an embodiment will be described in detail with reference to the drawings as needed. However, there are instances where excessively detailed descriptions may be omitted. For example, detailed descriptions of well-known matters or repeated descriptions of elements that are essentially the same may be omitted. This is to make the following descriptions easier to understand for those skilled in the art and to avoid redundancy.

Note that the inventors and the like provide the accompanying drawings and the following descriptions not to limit the scope of the claims, but to aid those skilled in the art to adequately understand the present disclosure.

EMBODIMENT

Hereinafter, an embodiment will be described with reference to FIG. 1 through FIG. 6. In FIG. 1 through FIG. 6, the widthwise direction of display device 2 is defined as the X-axis direction, the depth-wise direction of display device 2 is defined as the Y-axis direction, and the height-wise direction of display device 2 is defined as the Z-axis direction.

1. Overall Configuration of Display Device

Figure 1:
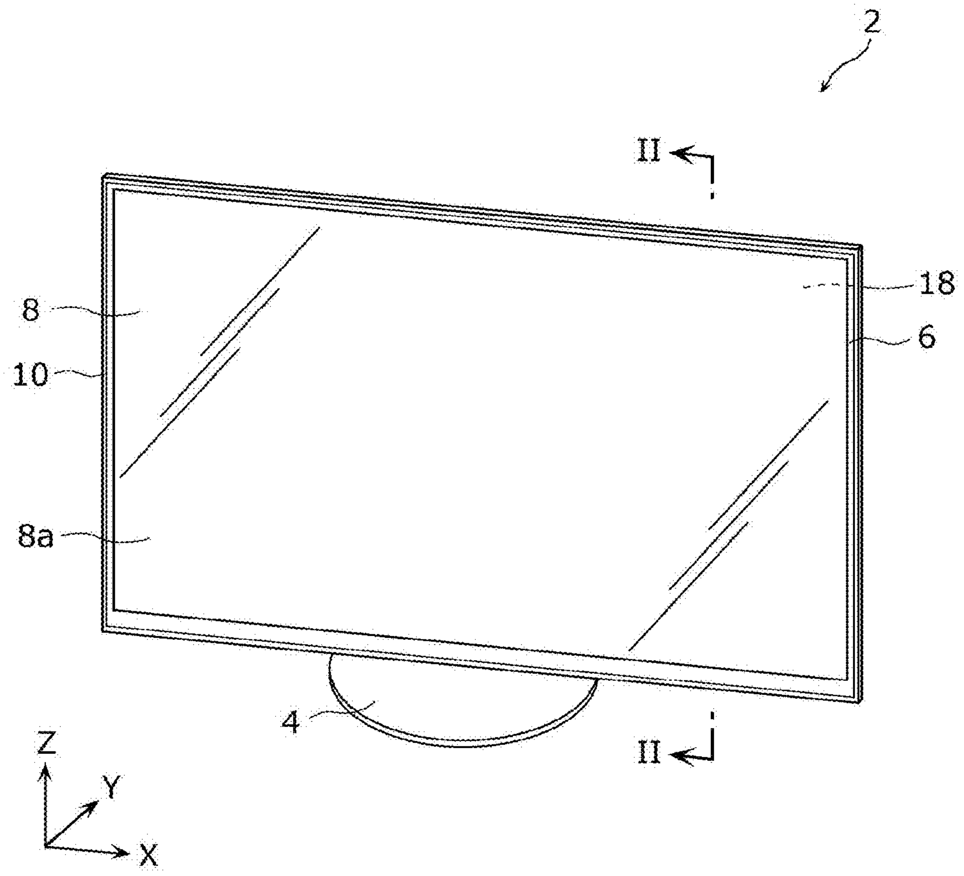
FIG. 1 is a perspective view of a display device according to an embodiment.
Figure 2:
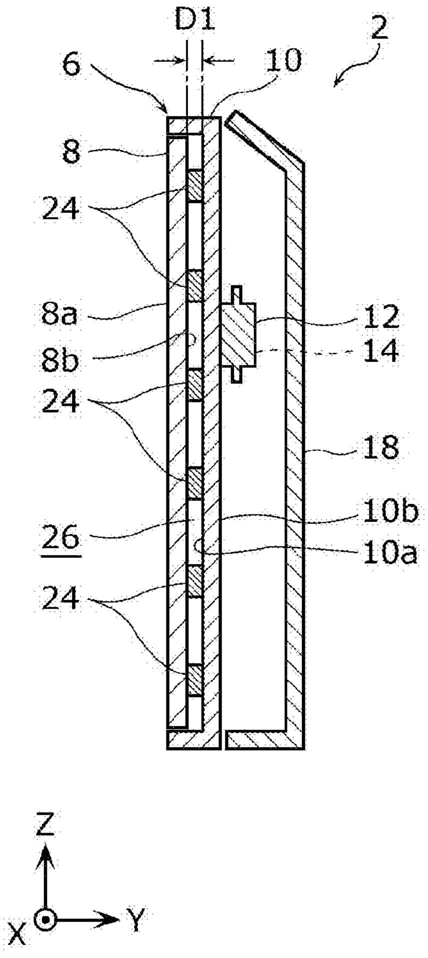
FIG. 2 is a schematic cross-sectional view of the display device according to the embodiment taken along line II-II in FIG. 1.
Figure 3:
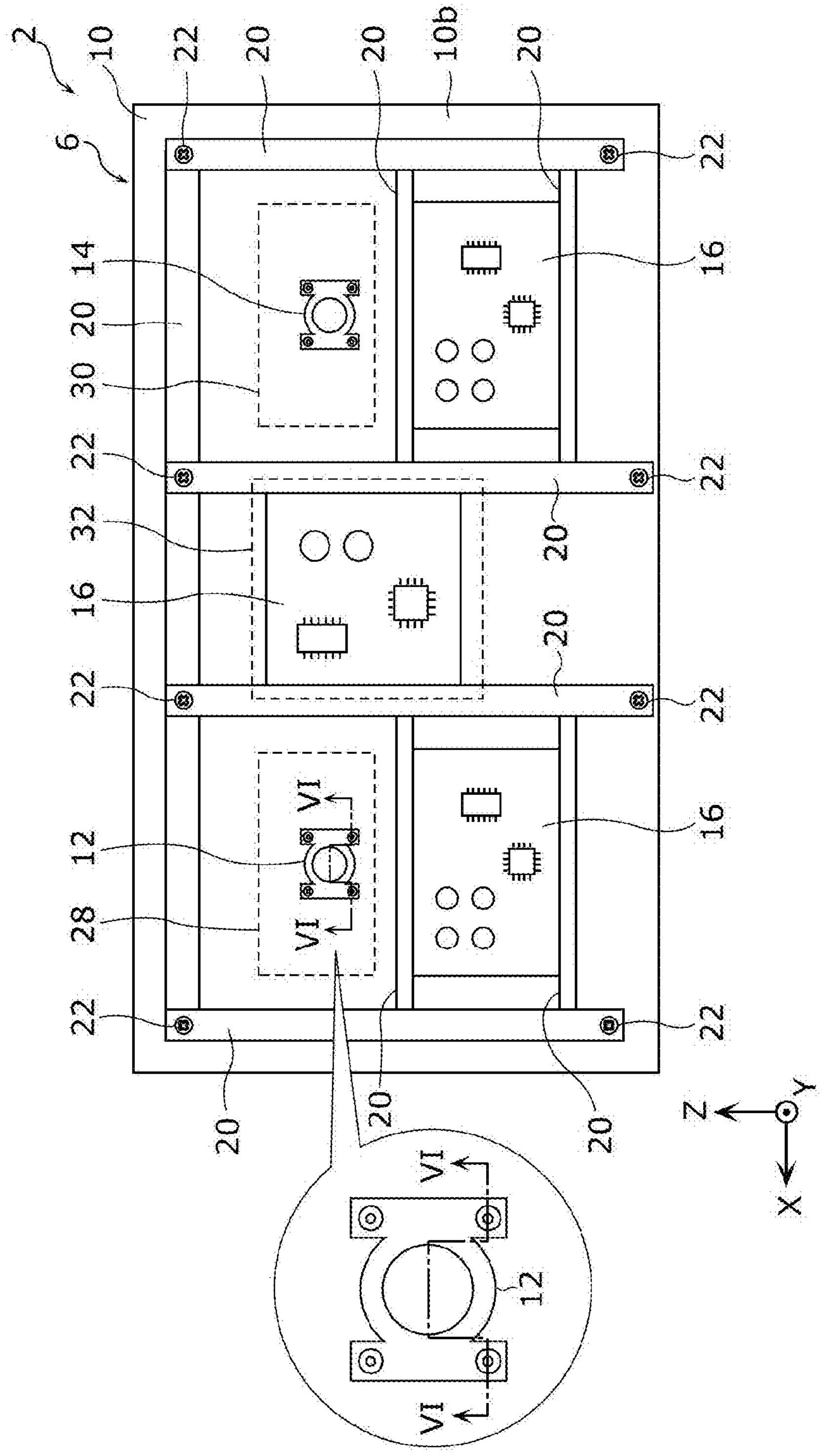
FIG. 3 is a diagram illustrating a back surface of a rear cover of the display device according to the embodiment with a back cover omitted.

First, an overall configuration of display device 2 according to an embodiment will be described with reference to FIG. 1 through FIG. 3. FIG. 1 is a perspective view of display device 2 according to the embodiment. FIG. 2 is a schematic cross-sectional view of display device 2 according to the embodiment taken along line II-II in FIG. 1. FIG. 3 is a diagram illustrating back surface 10*b* of rear cover 10 of display device 2 according to the embodiment with back cover 18 omitted.

As illustrated in FIG. 1, display device 2 is, for example, a stationary television receiver. Display device 2 includes stand 4 and display unit 6.

Stand 4 is for supporting display unit 6 from below. In FIG. 2 and FIG. 3, stand 4 has been omitted for illustrative purposes. Note that in the present embodiment, although display device 2 is a stationary television receiver, this example is not limiting, and stand 4 may be omitted, for example, and display device 2 may be a wall-mounted television receiver.

Display unit 6 is a flat-panel unit for displaying images and outputting audio. As illustrated in FIG. 1 through FIG. 3, display unit 6 includes display panel 8, rear cover 10, a pair of audio output units, namely, audio output unit 12 and audio output unit 14, a plurality of circuit boards 16, and back cover 18.

Display panel 8 includes, for example, an organic light-emitting diode (OLED) panel. A display surface on which images are displayed is provided on front surface 8*a* of display panel 8.

Rear cover 10 is a plate-shaped component for supporting various components, and is provided by press forming, or the like, a metal plate made of aluminum, iron, or the like, for example. As illustrated in FIG. 2, rear cover 10 is provided such that front surface 10*a* of rear cover 10 is facing back surface 8*b* (surface on reverse side of front surface 8*a*) of display panel 8. The peripheral portions of rear cover 10 are bent toward display panel 8 and provided so as to cover the peripheral portions of display panel 8. As illustrated in FIG. 3, a plurality of fittings 20 that are elongated in shape are fixed on back surface 10*b* (surface on reverse side of front surface 10*a*) of rear cover 10 by a plurality of screws 22. Note that in the present embodiment, although the peripheral portions of rear cover 10 are provided so as to cover the peripheral portions of display panel 8, this example is not limiting, and the peripheral portions of rear cover 10 may be provided so as to not cover the peripheral portions of display panel 8.

As illustrated in FIG. 2, a plurality of vibration transfer components 24 are interposed between back surface 8*b* of display panel 8 and front surface 10*a* of rear cover 10. Each of the plurality of vibration transfer components 24 is a component for transferring vibration of rear cover 10 to display panel 8. Each of the plurality of vibration transfer components 24 extend in a straight line along the widthwise direction of display device 2 (X-axis direction) and the plurality of vibration transfer components 24 are disposed at a given interval along the height-wise direction of display device 2 (Z-axis direction). Each of the plurality of vibration transfer components 24 includes, for example, double-sided adhesive tape, an adhesive, or the like. Accordingly, back surface 8*b* of display panel 8 and front surface 10*a* of rear cover 10 are fixed to each other via the plurality of vibration transfer components 24. Furthermore, the thickness of each of the plurality of vibration transfer components 24 is, for example, approximately 0.3 mm. Space 26 that has a length D1 (approximately 0.3 mm, for example) that is equivalent to the thickness of each of the plurality of vibration transfer components 24 is provided between back surface 8*b* of display panel 8 and front surface 10*a* of rear cover 10.

Heat generated by display panel 8 is transferred to rear cover 10 via space 26 (air layer) and the plurality of vibration transfer components 24, and dissipated from rear cover 10. In other words, rear cover 10 also functions as a heat dissipation component for dissipating heat in display panel 8.

It should be noted that in the present embodiment, although space 26 is provided between back surface 8*b* of display panel 8 and front surface 10*a* of rear cover 10, this example is not limiting, and nearly the entirety of back surface 8*b* of display panel 8 and nearly the entirety of front surface 10*a* of rear cover 10 may be fixed to each other via vibration transfer components 24. In other words, space 26 does not need to be provided between back surface 8*b* of display panel 8 and front surface 10*a* of rear cover 10.

Each of the plurality of circuit boards 16 is a printed circuit board on which is mounted a control circuit for controlling display panel 8 and the pair of audio output units, namely, audio output unit 12 and audio output unit 14, and which is supported on back surface 10*b* of rear cover 10 via a plurality of fittings 20. It should be noted that in FIG. 2, the plurality of circuit boards 16 and the plurality of fittings 20 have been omitted for illustrative purposes.

Each of the pair of audio output units, namely, audio output unit 12 and audio output unit 14 is an actuator unit for outputting audio by causing rear cover 10 to vibrate. In other words, the pair of audio output units, namely, audio output unit 12 and audio output unit 14, rear cover 10, and display panel 8 function as a stereo loudspeaker. Audio output unit 12 (an example of a first audio output unit) and audio output unit 14 (an example of a second audio output unit) are, respectively, an actuator unit for use in an R-channel (right channel) loudspeaker and an actuator unit for use in an L-channel (left channel) loudspeaker.

As illustrated in FIG. 2, each of the pair of audio output units, namely, audio output unit 12 and audio output unit 14 is supported on back surface 10*b* of rear cover 10, and is provided spaced apart from back surface 8*b* of display panel 8 (in other words, so as not to contact back surface 8*b* of display panel 8). Accordingly, rear cover 10 is present between display panel 8 and each of the pair of audio output units, namely, audio output unit 12 and audio output unit 14. Specifically, in back surface 10*b* of rear cover 10, a penetrating hole is not provided in the regions where either one of the pair of audio output units, namely, audio output unit 12 or audio output unit 14 is provided. In other words, each of the pair of audio output units, namely, audio output unit 12 and audio output unit 14 is spatially separated from space 26 by rear cover 10. Note that since each of the pair of audio output units, namely, audio output unit 12 and audio output unit 14 does not penetrate rear cover 10, each of the pair of audio output units, namely, audio output unit 12 and audio output unit 14 do not directly cause air present in space 26 to vibrate.

Note that in the present embodiment, although display unit 6 includes a pair of audio output units, namely, audio output unit 12 and audio output unit 14, this example is not limiting, and display unit 6 may include only a single audio output unit. Alternatively, display unit 6 may include three or more audio output units in order to further increase sound pressure.

As illustrated in FIG. 3, first region 28 on which audio output unit 12 is supported, second region 30 on which audio output unit 14 is supported, and third region 32 on which circuit board 16 is supported are provided on back surface 10*b* of rear cover 10. First region 28 is located toward one side in the widthwise direction of display device 2 (that is to say, to the right when viewed from the side of front surface 8*a* of display panel 8). Second region 30 is located toward another side in the widthwise direction of display device 2 (that is to say, to the left when viewed from the side of front surface 8*a* of display panel 8). Third region 32 is located in a central portion in the widthwise direction of display device 2 (that is to say, between first region 28 and second region 30).

Back cover 18 is a component for covering and protecting nearly the entire back surface 10*b* of rear cover 10, and is made of resin or the like, for example.

2. Configuration of Audio Output Unit

Next, a configuration of audio output unit 12 will be described with reference to FIG. 4 through FIG. 6. It should be noted that since each of the pair of audio output units, namely, audio output unit 12 and audio output unit 14 have the same configuration, hereinafter, only the configuration of audio output unit 12 will be described.

Figure 4:
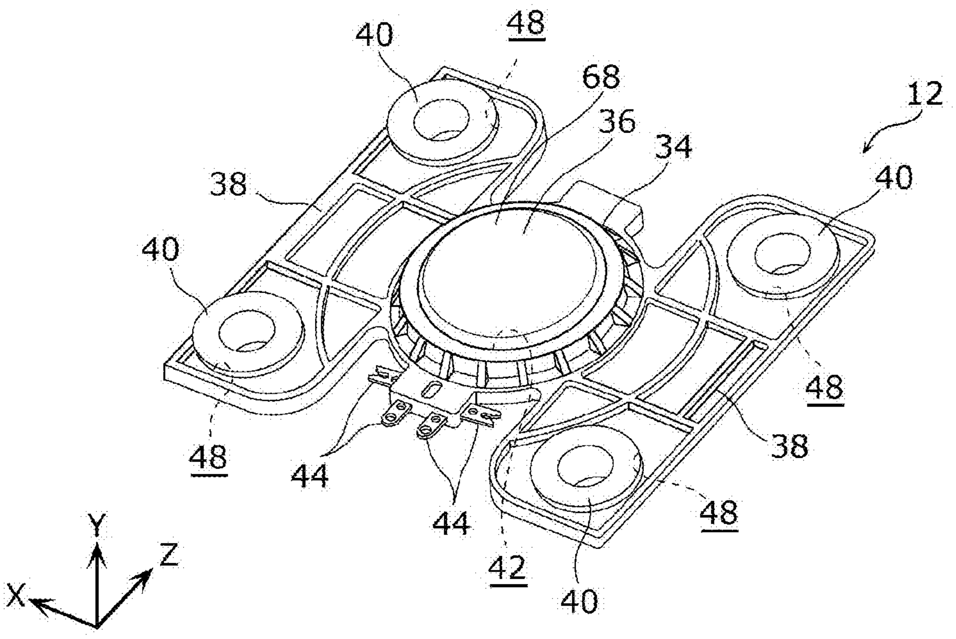
FIG. 4 is a perspective view of an audio output unit according to the embodiment.

FIG. 4 is a perspective view of audio output unit 12 according to the embodiment. FIG. 5 is a perspective view of audio output unit 12 according to the embodiment viewed from an angle different from that of FIG. 4. FIG. 6 is a cross-sectional view of audio output unit 12 according to the embodiment taken along line VI-VI in FIG. 3.

Figure 5:
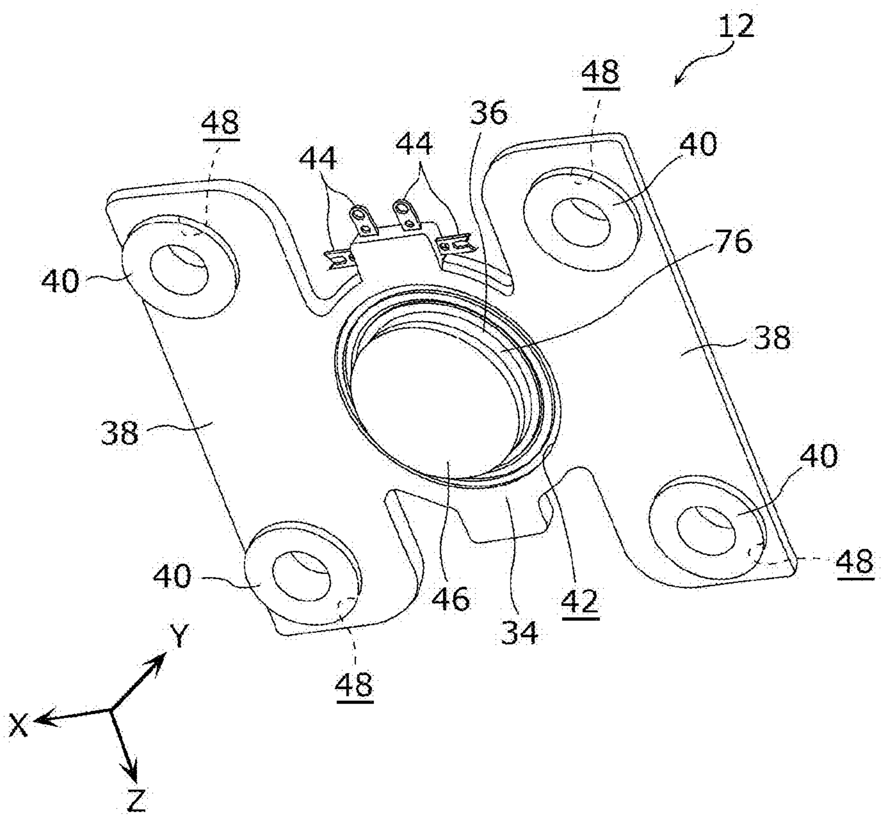
FIG. 5 is a perspective view of the audio output unit according to the embodiment viewed from an angle different from that of FIG. 4.

As illustrated in FIG. 4 and FIG. 5, audio output unit 12 includes main body 34, actuator 36, a pair of support portions 38, and a plurality of elastic components 40.

Main body 34 is a housing for supporting actuator 36. Opening 42 that is circular in shape is provided on main body 34. A plurality of electrode terminals 44 are provided on a side surface of main body 34. Each of the plurality of electrode terminals 44 is electrically connected to a lead wire (not illustrated in the figures) that extends from a corresponding one of the plurality of circuit boards 16 (see FIG. 3). Once power is supplied from circuit boards 16 to electrode terminals 44 via lead wires, the power is then supplied from electrode terminals 44 to actuator 36, thereby driving actuator 36.

Actuator 36 is a component for causing rear cover 10 to vibrate. As illustrated in FIG. 6, actuator 36 includes magnetic circuit 62, magnetic gap 64 provided in magnetic circuit 62, and voice coil 66 provided in magnetic gap 64.

Magnetic circuit 62 includes yoke 68, first magnet 70, center pole 72, and second magnet 74. Yoke 68 is supported by opening 42 of main body 34. As illustrated in FIG. 4 and FIG. 6, a portion of yoke 68 is exposed to the exterior of main body 34 so as to protrude from opening 42 away from rear cover 10 (toward the positive side of the Y-axis).

Voice coil 66 includes bobbin 76 that is cylindrical and coil 78 that is wrapped around the outer-circumferential surface of bobbin 76. Bobbin 76 is supported by opening 42 of main body 34 via damper 80. As illustrated in FIG. 5 and FIG. 6, one end of bobbin 76 in the axial direction (Y-axis direction) extends toward rear cover 10 from opening 42 of main body 34 (toward the negative side of the Y-axis), and is exposed to the exterior of main body 34. Furthermore, coupler 82 that is annular in shape is attached to one end of bobbin 76 in the axial direction. Coupler 82 (in other words, actuator 36) is fixed on back surface **10*b* of rear cover 10 via double-sided adhesive tape 46. In other words, in back surface 10*b* of rear cover 10, in regions in which voice coil 66 is present in between display panel 8 and actuator 36, an end of voice coil 66 in the axial direction is fixed by double-sided adhesive tape 46 via coupler 82. It should be noted that the thickness of double-sided adhesive tape 46** is, for example, approximately 0.4 mm.

In magnetic gap 64, a magnetic field is generated by the magnetic force of first magnet 70 and second magnet 74. When coil 78 of voice coil 66 is supplied with power from circuit board 16 via electrode terminal 44, voice coil 66 is subjected to force by the magnetic field in magnetic gap 64, and vibrates. The vibrations of voice coil 66 are transferred to rear cover 10 via coupler 82.

The pair of support portions 38 project from main body 34 in opposite directions from each other (in other words, outward from actuator 36). Each of the pair of support portions 38 is approximately rectangularly plate-shaped. As illustrated in FIG. 4 and FIG. 5, a pair of openings 48 that are circular are provided on both ends in the length-wise direction (Z-axis direction) of each support portion 38. Accordingly, the plurality (four, for example) of openings 48 are provided on the circumference of a circle centered on the central axis of actuator 36 so as to surround main body 34.

Note that in the present embodiment, although four openings 48 are provided, even when there are two openings 48, or six or more openings 48, for example, the two openings 48, or the six or more openings 48 are provided on the circumference of a circle centered on the central axis of actuator 36 so as to surround main body 34. Furthermore, in the present embodiment, although the plurality of openings 48 are provided on the circumference of a circle, this example is not limiting, and they may be arranged in any combination of positions.

Each of the plurality of elastic components 40 that is annular in shape is supported in a circumferential rim of a corresponding one of the plurality of openings 48. Each of the plurality (four, for example) of elastic components 40 is made of a material that has elastic restorative force, and is configured as a rubber bushing, for example. It should be noted that the vibration frequency of rear cover 10 (in other words, the audio characteristics of audio output unit 12) can be adjusted by changing the hardness of each of the plurality of elastic components 40.

Figure 6:
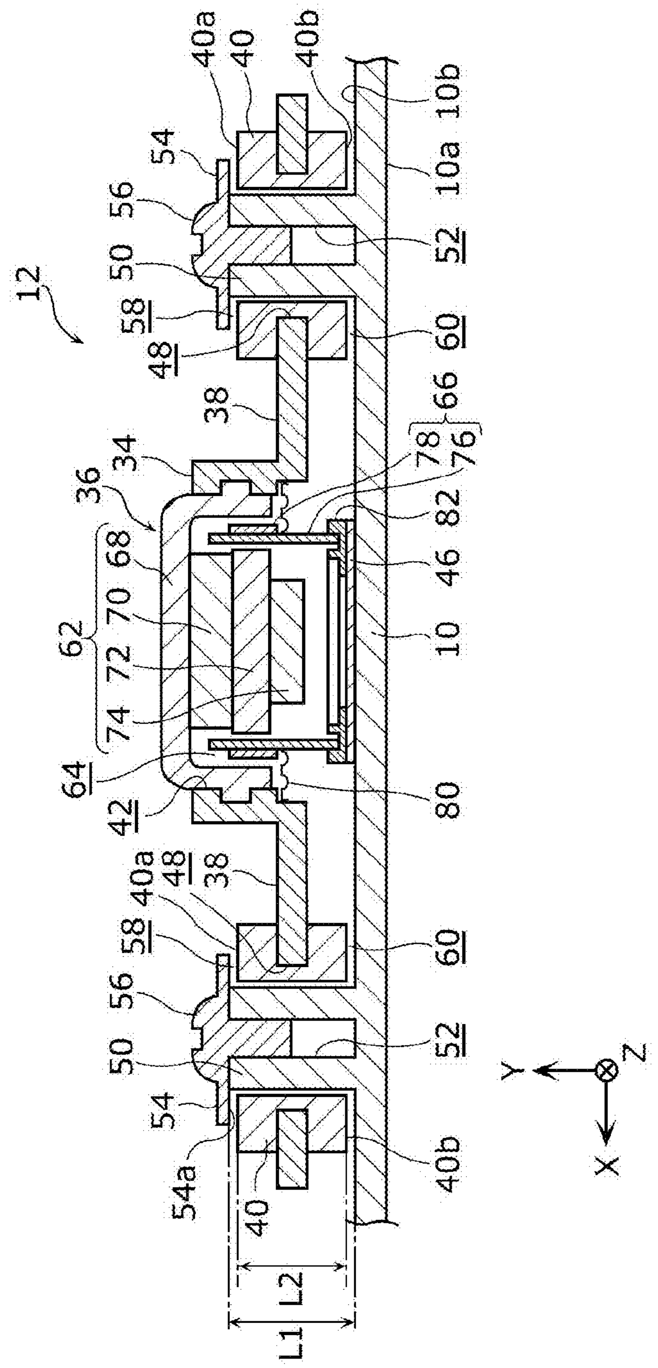
FIG. 6 is a cross-sectional view of the audio output unit according to the embodiment taken along line VI-VI in FIG. 3.

As illustrated in FIG. 6, a plurality (four, for example) of protrusions 50 that are cylindrical and that protrude away from display panel 8 (toward the positive side of the Y-axis) are provided on back surface **10*b* of rear cover 10. Each of the plurality of protrusions 50 are provided on the circumference of a circle centered on the central axis of actuator 36 so as to correspond to a corresponding one of the plurality of openings 48. Note that in the present embodiment, although the plurality of protrusions 50 are provided on the circumference of a circle, this example is not limiting, and they may be arranged in any combination of positions. Each of the plurality of protrusions 50 includes a corresponding one of a plurality of screw holes 52. Each of the plurality of protrusions 50 passes through a corresponding one of the plurality of openings 48 of a corresponding one of the pair of support portions 38 via a corresponding one of the plurality of elastic components 40. In this manner, protrusions 50 support support portions 38 via elastic components 40, thereby making it possible to suppress noise that occurs due to contact between protrusions 50 and support portions 38. It should be noted that the outer diameter of each of the plurality of protrusions 50 is slightly smaller than the inner diameter of a corresponding one of the plurality of elastic components 40**.

Furthermore, screws 56 that each include one of a plurality of flanges 54 are screwed into a corresponding one of the plurality of screw holes 52 provided for each of the plurality of protrusions 50. Each of the plurality of flanges 54 of the plurality of screws 56 is provided at a distal end of a corresponding one of the plurality of protrusions 50 and has an outer diameter larger than the outer diameter of the corresponding one of the plurality of protrusions 50. In other words, flanges 54 protrude outward in a radial direction relative to protrusions 50 and overlap with first ends **40*a* (ends closer to flanges 54) of elastic components 40** when viewing the XZ-plane.

First gaps 58 are provided between first ends **40*a* of elastic components 40 and flanges 54. The length (length in the Y-axis direction) of each of the plurality of first gaps 58 is, for example, approximately 1.0 mm. Furthermore, second gaps 60 are provided between back surface 10*b* of rear cover 10 and second ends 40*b* (ends farther from flanges 54) of elastic components 40. The length (length in the Y-axis direction) of each of the plurality of second gaps 60 is, for example, approximately 1.0 mm. In other words, length L1, which is the length of each of the plurality of protrusions 50 in the Y-axis direction (i.e., the distance between surface 54***a*, which is included among the surfaces of flange 54 of screw 56 that face rear cover 10 when screw 56 is completely screwed into screw hole 52, and back surface 10*b* of rear cover 10) is, for example, 2.0 mm longer than length L2, which is the length of each of the plurality of elastic components 40 in the Y-axis direction (i.e., the distance between first end 40*a* and second end 40*b* of elastic component 40). Accordingly, each of the plurality of elastic components 40 does not contact flanges 54 or back surface 10*b* of rear cover 10 and acts as a component having free ends.

In audio output unit 12 as described above, when actuator 36 is driven, actuator 36 causes rear cover 10 to vibrate. It should be noted that when the vibrations of actuator 36 are transferred to the pair of support portions 38 via main body 34, each of the plurality of elastic components 40 slide along the axial direction (Y-axis direction) of a corresponding one of the plurality of protrusions 50 on the outer-circumferential surface of the corresponding one of the plurality of protrusions 50. When there is no gap between the outer-circumferential surface of protrusion 50 and the inner-circumferential surface of a corresponding one of the plurality of elastic components 40, and the corresponding one of the plurality of elastic components 40 is fixed to the outer-circumferential surface of protrusion 50, noise may occur due to resonance resulting from the formation of a resonant system of support portion 38 that is different from the resonant system of actuator 36. In order to suppress the occurrence of such noise, elastic components 40 may be provided so as to be able to slide across the outer-circumferential surfaces of protrusions 50. The vibrations of rear cover 10 are transferred to display panel 8 via a plurality of vibration transfer components 24. Accordingly, display panel 8 vibrates so as to follow the vibrations of rear cover 10. Rear cover 10 and display panel 8 vibrate, thereby causing audio to be output.

3. Advantageous Effects

Figure 7A:
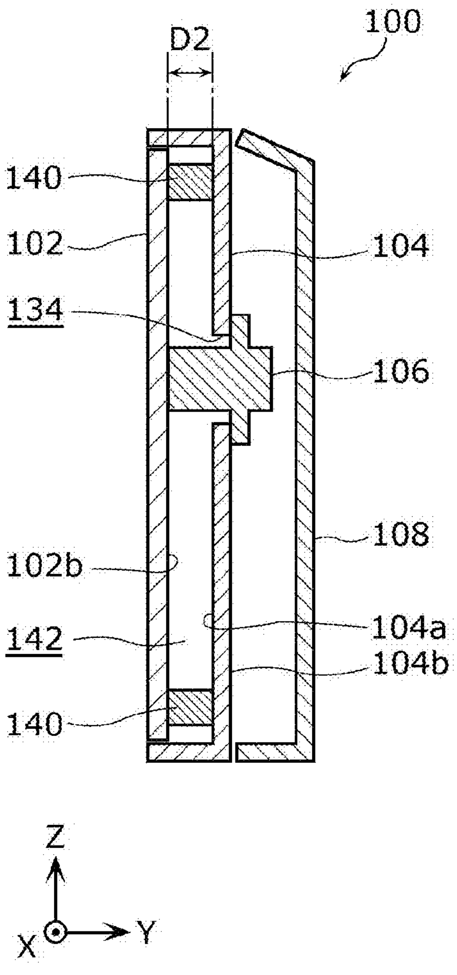
FIG. 7A is a schematic cross-sectional view of a display device according to Comparative Example 1.
Figure 7B:
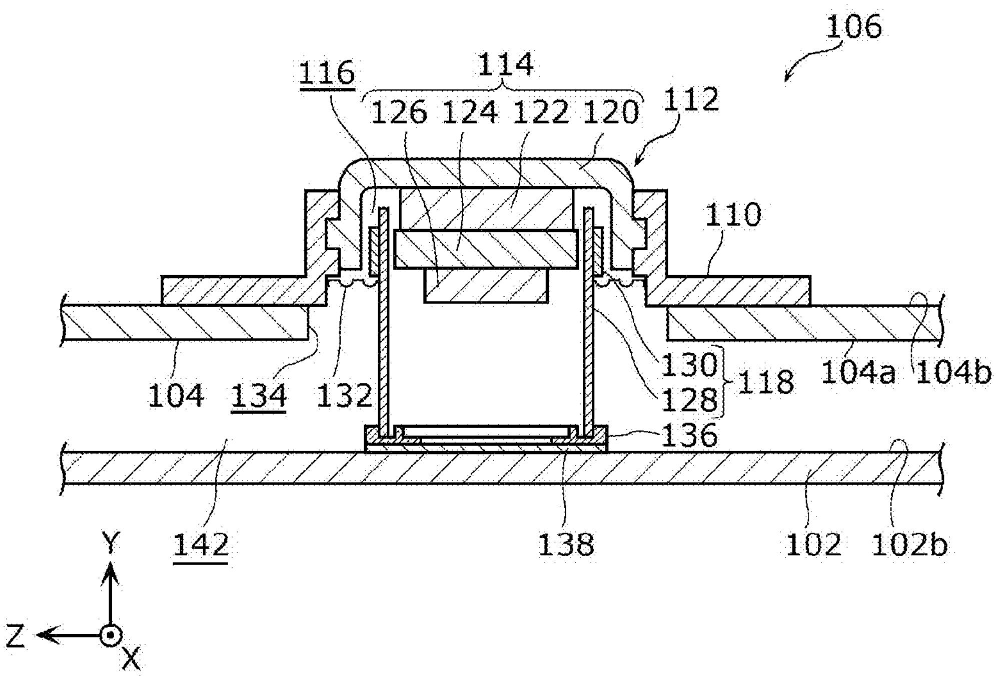
FIG. 7B is a cross-sectional view illustrating an audio output unit of the display device according to Comparative Example 1 in detail.

A configuration of display device 100 according to Comparative Example 1 will be described with reference to FIG. 7A and FIG. 7B. FIG. 7A is a schematic cross-sectional view of display device 100 according to Comparative Example 1. FIG. 7B is a cross-sectional view illustrating audio output unit 106 of display device 100 according to Comparative Example 1 in detail.

As illustrated in FIG. 7A, display device 100 according to Comparative Example 1 includes display panel 102, rear cover 104, audio output unit 106, and back cover 108.

Audio output unit 106 is an actuator unit for causing display panel 102 to vibrate. As illustrated in FIG. 7B, audio output unit 106 includes support component 110 and actuator 112.

Support component 110 is a component for supporting actuator 112 and is attached to back surface 104*b* of rear cover 104 by screws or the like. In other words, actuator 112 is supported by back surface 104*b* of rear cover 104 via support component 110

Actuator 112 has a configuration that is the same as above-mentioned actuator 36. In other words, actuator 112 includes magnetic circuit 114, magnetic gap 116 provided in magnetic circuit 114, and voice coil 118 provided in magnetic gap 116.

Magnetic circuit 114 includes yoke 120, first magnet 122, center pole 124, and second magnet 126. Voice coil 118 includes bobbin 128 that is cylindrical and coil 130 that is wrapped around the outer-circumferential surface of bobbin 128. Bobbin 128 is supported by support component 110 via damper 132.

Furthermore, in back surface 104*b* of rear cover 104, penetrating hole 134 is provided in the region where actuator 112 is provided. Bobbin 128 of voice coil 118 passes through penetrating hole 134 of rear cover 104, and one end of bobbin 128 in the axial direction is fixed to back surface 102*b* of display panel 102 by double-sided adhesive tape 138 via coupler 136. In display device 100 according to Comparative Example 1, actuator 112 causes display panel 102 to vibrate, thereby causing audio to be output.

As illustrated in FIG. 7A, a plurality of double-sided adhesive tape 140 are interposed between back surface 102*b* of display panel 102 and front surface 104*a* of rear cover 104. Accordingly, back surface 102*b* of display panel 102 and front surface 104*a* of rear cover 104 are fixed to each other via the plurality of double-sided adhesive tape 140. Furthermore, the thickness of each of the plurality of double-sided adhesive tape 140 is, for example, approximately 0.9 mm. Space 142 for allowing display panel 102 to vibrate is provided between back surface 102*b* of display panel 102 and front surface 104*a* of rear cover 104. Length D2 of space 142 is equivalent to the thickness of each of the plurality of double-sided adhesive tape 140 (0.9 mm, for example).

In display device 100 according to Comparative Example 1 a length D2 of space 142 that is sufficient for allowing display panel 102 to vibrate needs to be secured. However, in such a configuration, a majority of heat generated by display panel 102 is released into space 142 (air layer), thereby making it difficult to transfer the heat to rear cover 104. Accordingly, deterioration of the heat dissipation performance of display panel 102 is problematic. Furthermore, since actuator 112 of audio output unit 106 is directly fixed to display panel 102, which is costly and easy to damage, it is problematic that display panel 102 becomes susceptible to damage due to stress applied to display panel 102.

Furthermore, in display device 100 according to Comparative Example 1, since actuator 112 of audio output unit 106 contacts back surface 102*b* of display panel 102, heat generated by actuator 112 of audio output unit 106 is transferred to display panel 102, thereby leading to problematic increases in the temperature of display panel 102.

Figure 8:
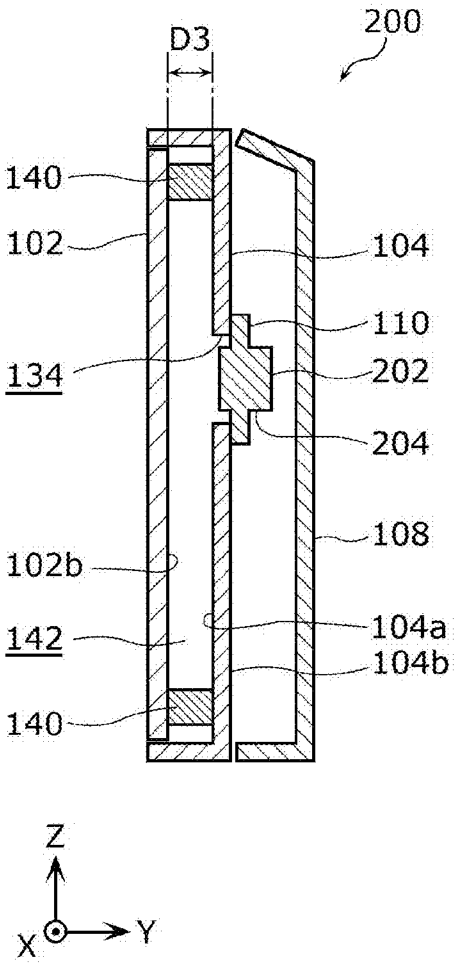
FIG. 8 is a schematic cross-sectional view of a display device according to Comparative Example 2.

Next, a configuration of display device 200 according to Comparative Example 2 will be described with reference to FIG. 8. FIG. 8 is a schematic cross-sectional view of display device 200 according to Comparative Example 2. Note that in FIG. 8, elements that are the same as the elements in display device 100 according to Comparative Example 1 as described above share like reference signs, and related description thereof is omitted.

As illustrated in FIG. 8, display device 200 according to Comparative Example 2 includes display panel 102, rear cover 104, audio output unit 202, and back cover 108.

Audio output unit 202 is an actuator unit for causing space 142 to vibrate. Audio output unit 202 includes support component 110 and actuator 204.

Although detailed illustration has been omitted, in the same manner as in actuator 112 as described above, actuator 204 includes a magnetic circuit, a magnetic gap, and a voice coil. In back surface 104*b* of rear cover 104, penetrating hole 134 is provided in the region where actuator 204 is provided. Actuator 204 is supported by back surface 104*b* of rear cover 104 via support component 110 so as to cover penetrating hole 134 of rear cover 104. In other words, actuator 204 is exposed in space 142 through penetrating hole 134 of rear cover 104. Actuator 204 directly causes air present in space 142 to vibrate via penetrating hole 134, and the air present in space 142 further causes display panel 102 to vibrate. Accordingly, actuator 204 is not directly connected to back surface 102*b* of display panel 102, and actuator 204 causes display panel 102 to vibrate via air present in space 142, thereby causing audio to be output.

In display device 200 according to Comparative Example 2 a length D3 of space 142 that is sufficient for allowing space 142 to vibrate needs to be secured. However, in such a configuration, in the same manner as in Comparative Example 1 as described above, a majority of heat generated by display panel 102 is released into space 142, thereby making it difficult to transfer the heat to rear cover 104. Accordingly, deterioration of the heat dissipation performance of display panel 102 is problematic.

In order to solve these problems, the present embodiment is provided with the characteristics given in techniques 1 to 6 as described hereinafter.

(Technique 1) Display device 2 includes: display panel 8 that displays an image on front surface 8*a* of display panel 8; rear cover 10 that includes front surface 10*a* facing back surface 8*b* of display panel 8; and audio output unit 12 that outputs audio by causing rear cover 10 to vibrate. Audio output unit 12 is provided spaced apart from back surface 8*b* of display panel 8 and supported on back surface 10*b* of rear cover 10.

Accordingly, audio output unit 12 is supported on back surface 10*b* of rear cover 10 and causes rear cover 10 to vibrate. As a result, a length D1 of space 26 that is sufficient for allowing display panel 8 to vibrate does not need to be secured between back surface 8*b* of display panel 8 and front surface 10*a* of rear cover 10. Accordingly, length D1 of space 26 can be made smaller than length D2 of space 142 in display device 100 according to the comparative example. As a result, a majority of heat generated by display panel 8 can be transferred to rear cover 10 via space 26, thereby making it possible to improve the heat dissipation performance of display panel 8. Furthermore, since audio output unit 12 is provided spaced apart from back surface 8*b* of display panel 8, heat generated by audio output unit 12 can be inhibited from being transferred to display panel 8, thereby making it possible to inhibit the temperature of display panel 8 from increasing. Furthermore, since audio output unit 12 is supported on back surface 10*b* of rear cover 10, display panel 8, which is costly and easy to damage, can be prevented from being damaged.

(Technique 2) Display device 2 according to Technique 1 further includes: vibration transfer component 24 for transferring vibration of rear cover 10 to display panel 8. Vibration transfer component 24 is interposed between back surface 8*b* of display panel 8 and front surface 10*a* of rear cover 10.

Accordingly, when audio output unit 12 causes rear cover 10 to vibrate, the vibrations of rear cover 10 can be transferred to display panel 8 via vibration transfer component 24. As a result, display panel 8 can be caused to vibrate so as to follow the vibrations of rear cover 10, thereby making it possible to effectively output audio.

(Technique 3) Display device 2 according to Technique 1, wherein back surface 8*b* of display panel 8 and front surface 10*a* of rear cover 10 are in contact with each other.

Accordingly, heat generated by display panel 8 can be efficiently transferred to rear cover 10, thereby making it possible to effectively improve the heat dissipation performance of display panel 8.

(Technique 4) Display device 2 according to any one of techniques 1 to 3, wherein audio output unit 12 includes: actuator 36 that is fixed to back surface 10*b* of rear cover 10 and causes rear cover 10 to vibrate; support portion 38 that projects outward from actuator 36 and includes opening 48; and elastic component 40 that is annular in shape and is supported by a circumferential rim of opening 48 of support portion 38. Protrusion 50 that protrudes away from display panel 8 is provided on back surface 10*b* of rear cover 10, and protrusion 50 passes through opening 48 of support portion 38 via elastic component 40.

Accordingly, since support portion 38 is supported by protrusion 50 via elastic component 40, elastic component 40 can absorb the vibrations transferred from actuator 36 to support portion 38. As a result, the stress applied to support portion 38 due to the vibrations can be reduced.

(Technique 5) Display device 2 according to Technique 4, further includes: flange 54 that is provided at a distal end of protrusion 50 and has an outer diameter larger than an outer diameter of protrusion 50, wherein first gap 58 is provided between first end 40*a* of elastic component 40 and flange 54, and second gap 60 is provided between back surface 10*b* of rear cover 10 and second end 40*b* of elastic component 40.

Accordingly, by allowing support portion 38 to act as a component having free ends, the formation of a resonant system of support portion 38 that is different from the resonant system of actuator 36 can be prevented. As a result, noise that occurs due to the formation of multiple resonant systems can be prevented.

(Technique 6) Display device 2 according to any one of techniques 1 to 5, further includes: circuit board 16 supported on back surface 10*b* of rear cover 10, wherein the audio output unit includes audio output unit 12 (first audio output unit) and audio output unit 14 (second audio output unit), and back surface 10*b* of rear cover 10 includes: first region 28 on which audio output unit 12 is supported; second region 30 on which audio output unit 14 is supported; and third region 32 on which circuit board 16 is supported. Third region 32 is disposed between first region 28 and second region 30.

Accordingly, vibration of first region 28 caused by audio output unit 12 and vibration of second region 30 caused by audio output unit 14 can be separated by circuit board 16 supported on third region 32. As a result, crosstalk can be prevented from occurring between the vibration of first region 28 caused by audio output unit 12 and the vibration of second region 30 caused by audio output unit 14.

OTHER EMBODIMENTS

As presented above, the embodiment has been described as an exemplification of the techniques disclosed in the present application. However, the techniques in the present disclosure are not limited to these examples, and the techniques are also applicable to embodiments arrived at by making modifications, substitutions, additions, omissions, etc., as necessary. Moreover, new embodiments may also be obtained by combining the various elements described in the above embodiment.

Next, other embodiments will be described.

In the above embodiment, although an example where display device 2 is a liquid-crystal television receiver is described, this example is not limiting, and display device 2 may, for example, be a display for use in a personal computer, tablet device, or the like.

In the above embodiment, although display device 2 includes two audio output units, namely, audio output unit 12 and audio output unit 14, this example is not limiting, and display device 2 may include one audio output unit or three or more audio output units.

In the above, embodiment, although display panel 8 includes an organic light-emitting diode (OLED) panel, this example is not limiting, and display panel 8 may, for example, include a liquid-crystal module or the like.

In the above embodiment, although audio output unit 12 and audio output unit 14 cause rear cover 10 of display device 2 to vibrate, this example is not limiting, and audio output unit 12 and audio output unit 14 may cause any component to vibrate, such as various fittings or the like that are plate-shaped, for example.

As presented above, the embodiment has been described to exemplify the techniques of the present disclosure. Toward this end, the accompanying drawings and detailed descriptions have been provided.

Consequently, the elements described in the accompanying drawings and detailed descriptions include not only those elements essential to solving the problem, but they may also include elements which, while not being essential to solving the problem, have been included in order to exemplify the aforementioned technique. For this reason, such non-essential elements should not readily be deemed to be essential based on the mere fact that they are described in the accompanying drawings and detailed descriptions.

Moreover, the above-mentioned embodiments are used to exemplify techniques described in the present disclosure. Thus, various modifications, substitutions, additions, omissions, or the like can be made within the scope of the claims and the equivalents thereof.

INDUSTRIAL APPLICABILITY

The present disclosure is applicable to display devices, such as television receivers and the like that can output audio, for example.

REFERENCE SIGNS LIST

2, 100, 200 display device
4 stand
6 display unit
8, 102 display panel
8*a*, 10*a*, 104*a* front surface
8*b*, 10*b*, 102*b*, 104*b* back surface
10, 104 rear cover
12, 14, 106, 202 audio output unit
16 circuit board
18, 108 back cover
20 fitting
22, 56 screw
24 vibration transfer component
26, 142 space
28 first region
30 second region
32 third region
34 main body
36, 112, 204 actuator
38 support portion
40 elastic component
40*a* first end
40*b* second end
42, 48 opening
44 electrode terminal
46, 138, 140 double-sided adhesive tape
50 protrusion
52 screw hole
54 flange
54*a* surface
58 first gap
60 second gap
62, 114 magnetic circuit
64, 116 magnetic gap
66, 118 voice coil
68, 120 yoke
70, 122 first magnet
72, 124 center pole
74, 126 second magnet
76, 128 bobbin
78, 130 coil
80, 132 damper
82, 136 coupler
110 support component
134 penetrating hole

The invention claimed is:

1. A display device comprising:
a display panel that displays an image on a front surface of the display panel;
a rear cover that includes a front surface facing a back surface of the display panel; and
an audio output unit that outputs audio by causing the rear cover to vibrate, the audio output unit being provided spaced apart from the back surface of the display panel and supported on a back surface of the rear cover, wherein
the audio output unit includes:
an actuator that is fixed to the back surface of the rear cover and causes the rear cover to vibrate;
a support portion that projects outward from the actuator and includes an opening; and
an elastic component that is annular in shape and is supported by a circumferential rim of the opening of the support portion,
a protrusion that protrudes away from the display panel is provided on the back surface of the rear cover, and
the protrusion passes through the opening of the support portion via the elastic component.

2. The display device according to claim 1, further comprising:
a vibration transfer component for transferring vibration of the rear cover to the display panel, the vibration transfer component being interposed between the back surface of the display panel and the front surface of the rear cover.

3. The display device according to claim 1, wherein
the back surface of the display panel and the front surface of the rear cover are in contact with each other.

4. The display device according to claim 1, further comprising:
a flange that is provided at a distal end of the protrusion and has an outer diameter larger than an outer diameter of the protrusion, wherein
a first gap is provided between a first end of the elastic component and the flange, and a second gap is provided between the back surface of the rear cover and a second end of the elastic component.

5. The display device according to claim 1, further comprising:
a circuit board supported on the back surface of the rear cover, wherein
the audio output unit includes a first audio output unit and a second audio output unit, and
the back surface of the rear cover includes:

a first region on which the first audio output unit is supported;

a second region on which the second audio output unit is supported; and a third region on which the circuit board is supported, the third region being disposed between the first region and the second region.

* * * * *